No. 606,849. Patented July 5, 1898.
W. A. TOWNES.
CURRYCOMB.
(Application filed Oct. 16, 1897.)
(No Model.)
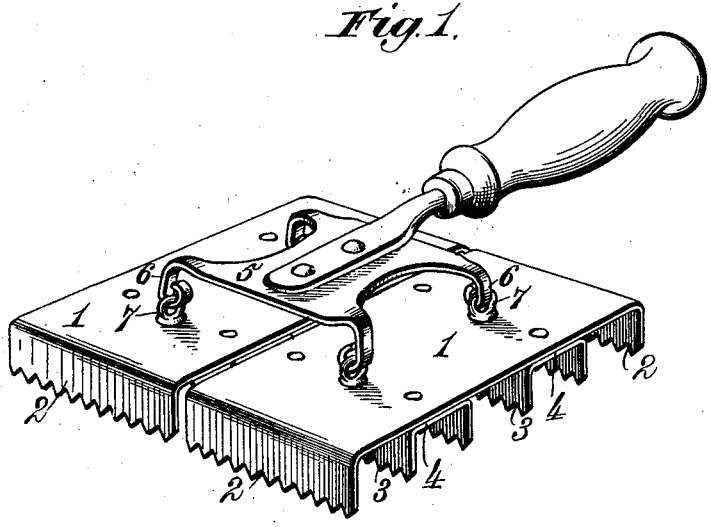
Fig. 1.
Fig. 2.
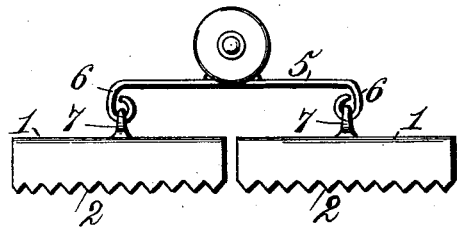
Witnesses.
Robert Everett
H. B. Keefer
Inventor.
William Andrew Townes,
By James L. Norris.
Atty.

UNITED STATES PATENT OFFICE.

WILLIAM ANDREW TOWNES, OF MILAN, TENNESSEE.

CURRYCOMB.

SPECIFICATION forming part of Letters Patent No. 606,849, dated July 5, 1898.

Application filed October 16, 1897. Serial No. 655,421. (No model.)

*To all whom it may concern:*

Be it known that I, WILLIAM ANDREW TOWNES, a citizen of the United States, residing at Milan, in the county of Gibson and State of Tennessee, have invented new and useful Improvements in Currycombs, of which the following is a specification.

This invention has for its object to provide a currycomb capable of convenient manipulation upon all parts of the surfaces to be cleaned and which, by means of pivotally-connected and independently-acting parts, shall be adapted to conform to irregularities, such as depressions and prominences of the animal's body, so that it can be rapidly and thoroughly cleansed without discomfort to the animal.

The invention consists in a currycomb composed of two independently-acting and separately-yielding parts or comb-sections, a connecting bar or plate to which the said comb-sections are pivotally connected, and a suitable handle attached to the said connecting-bar, all as hereinafter described and claimed.

In the annexed drawings, Figure 1 is a perspective of a currycomb constructed according to my invention. Fig. 2 is a side view of the currycomb.

The reference-numeral 1 designates each of two independently-yielding comb sections or parts, each of which is preferably composed of a metallic plate of any suitable length and breadth. The ends of each plate or section 1 are bent downward approximately at right angles and have their edges serrated or otherwise provided with teeth 2 of any proper form. Between the rows of teeth 2 there are provided on the acting faces of the comb-sections other rows of teeth 3, that may be formed by serrating the edges of a trough-shaped bar or plate 4 to be riveted to the plates or main comb-sections 1, on which said bar is transversely arranged. The number and width of these serrated trough-shaped plates 4 and their distance apart will determine the distance between the rows of comb-teeth. Obviously the teeth of the comb may be arranged in any number of rows desired.

By referring to the drawings it will be seen that the two comb-sections 1 are placed side by side at a suitable distance or interval. The space thus provided between these two comb parts or sections should be sufficient to permit each to act independent of the other and without conflicting in any way. This is accomplished by means of a connecting bar or plate 5, to which the spaced-apart sections 1 are pivotally connected in such manner that each can yield in contact with irregularities of the surface of the horse's body without interfering with the action of the other comb-section.

As a means of attaching the connecting-bar 5 to the spaced-apart and independently-yielding comb-sections 1 it is preferable to provide each end of said bar with two downwardly-turned prongs 6, having their extremities hooked into eyes or rings 7 on the back of each comb part or plate. The eyes or rings 7 may be conveniently formed on rivets secured in the plates 1, or they may be otherwise attached in any suitable manner.

The connection of the prongs 6 and rings 7 is such as to give the two spaced-apart comb-sections 1 a pivotal support, so that they will be independently capable of a rocking and up-and-down yielding action in contact with depressions, irregularities, and projections of the surface to be cleaned. A handle of any suitable or convenient form may be secured to the bar 5, that yieldingly connects the two spaced-apart and independently-acting combs.

With this implement all the parts of the animal's body and limbs may be easily and thoroughly cleaned with no irritation of tender spots and without making the animal restless.

The plate or bar 5 is preferably elevated about half an inch above the comb-sections 1, thereby affording ample room for the tilting or pivotal action of the comb parts and allowing the handle to be straight, if desired. Ordinary staples may be employed for connecting the hooked prongs 6 of the plate 5 with the backs of the comb-sections. The handle of the implement may have any shape deemed most convenient or desirable.

If desired, the prongs 6 may be omitted and the ends of the plate 5 be made solid, but bent downward and curved into cylindrical form to engage long staples that will be secured to the comb-backs, thus providing a very simple hinge connection between the combs and the handle-plate.

What I claim as my invention is—

1. In a currycomb, the combination with two independently-acting comb-sections, of a connecting-bar having downwardly-turned end portions, and means for pivotally attaching each comb-section to one of said downwardly-turned portions of said connecting-bar, whereby each comb-section is adapted to have a yielding movement independent of the other comb-section, substantially as described.

2. In a currycomb, the combination with two independently-acting comb-sections, of a transversely-arranged connecting-bar having each end provided with downwardly-turned prongs, and means for pivotally connecting the comb-sections with said prongs, whereby each comb-section is adapted to have a yielding movement independent of the other comb-section, substantially as described.

3. In a currycomb, the combination with two spaced-apart and independently-acting comb-sections having their backs provided with eyes or rings, of a transversely-arranged connecting-bar having each end provided with downwardly-turned prongs engaged with the said eyes or rings of the comb-sections whereby each comb-section is adapted to have a yielding movement independent of the other, and a handle attached to said connecting-bar, substantially as described.

In testimony whereof I have hereunto set my hand in presence of two subscribing witnesses.

WILLIAM ANDREW TOWNES.

Witnesses:
C. P. HAUN,
W. E. McNAIL.